United States Patent
Okabayashi

(10) Patent No.: US 10,362,014 B2
(45) Date of Patent: Jul. 23, 2019

(54) PROXY AUTHENTICATION METHOD AND COMMUNICATION DEVICE

(71) Applicant: FUJITSU LIMITED, Kawasaki-shi, Kanagawa (JP)

(72) Inventor: Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 15/172,461

(22) Filed: Jun. 3, 2016

(65) Prior Publication Data

US 2017/0026357 A1 Jan. 26, 2017

(30) Foreign Application Priority Data

Jul. 24, 2015 (JP) ................................. 2015-147260

(51) Int. Cl.
| | | |
|---|---|---|
| G06F 21/00 | (2013.01) | |
| H04L 29/06 | (2006.01) | |
| H04W 12/06 | (2009.01) | |
| H04W 4/80 | (2018.01) | |
| H04W 12/00 | (2009.01) | |

(52) U.S. Cl.
CPC .......... H04L 63/08 (2013.01); H04L 63/0884 (2013.01); H04W 4/80 (2018.02); H04W 12/06 (2013.01); H04W 12/00407 (2019.01)

(58) Field of Classification Search
CPC ..... H04L 63/08; H04L 63/0884; H04L 43/16; H04W 4/008; H04W 12/06
See application file for complete search history.

(56) References Cited

U.S. PATENT DOCUMENTS

| | | | |
|---|---|---|---|
| 5,103,392 A | 4/1992 | Mori | |
| 7,139,820 B1* | 11/2006 | O'Toole, Jr. | .......... H04L 63/123 709/223 |
| 2013/0217332 A1* | 8/2013 | Altman | .................. H04H 60/90 455/41.2 |

FOREIGN PATENT DOCUMENTS

| | | |
|---|---|---|
| JP | 60-77218 | 5/1985 |
| JP | 2003-248866 | 9/2003 |
| JP | 2015-22399 | 2/2015 |
| JP | 2015-65521 | 4/2015 |

* cited by examiner

*Primary Examiner* — Kendall Dolly
(74) *Attorney, Agent, or Firm* — Xsensus LLP

(57) ABSTRACT

A proxy authentication method executed by a communication device includes acquiring equipment identification information from equipment, the equipment identification identifying the equipment, transmitting the equipment identification information to a server that provides a service according to the equipment, receiving, from at least one of the server and the equipment, a condition relating to a range confined based on at least one of time and distance, and providing, based on the condition, at least one of the equipment identification information and a value relating to the equipment identification information to another communication device estimated to exist in the range.

9 Claims, 22 Drawing Sheets

FIG. 4

| USER ID | UNIQUE VALUE | TAG ID | RECEIVED PROXY AUTHENTICATION VALUE | TRANSMITTED PROXY AUTHENTICATION VALUE |
|---|---|---|---|---|
| 001 | xxxx1 | tag1 | Null | yyyy1 |
| 002 | xxxx2 | Null | yyyy1 | yyyy2 |
| ... | ... | ... | ... | ... |

FIG. 5

| TAG ID | CONDITION |
|---|---|
| tag1 | ELAPSED TIME IS EQUAL TO OR SHORTER THAN THREE MINUTES |
| tag2 | ELAPSED TIME IS EQUAL TO OR SHORTER THAN FIVE MINUTES |
| ... | ... |

FIG. 6

| TAG ID | GROUP MEMBERS |
|--------|---------------|
| tag1   | 001、002、···  |
| tag2   | 100、101、···  |
| ···    | ···           |

FIG. 8

| PROXY AUTHENTICATION VALUE | CONDITION |
|---|---|
| yyyy1 | ELAPSED TIME IS EQUAL TO OR SHORTER THAN THREE MINUTES |

FIG. 15

| USER ID | UNIQUE VALUE | TERMINAL ID |
|---------|--------------|-------------|
| 001     | xxxx1        | terminal1   |
| 002     | xxxx2        | Null        |
| ...     | ...          | ...         |

FIG. 17

| CONDITION |
|---|
| ELAPSED TIME IS EQUAL TO OR SHORTER THAN THREE MINUTES |

PROXY AUTHENTICATION METHOD AND COMMUNICATION DEVICE

CROSS-REFERENCE TO RELATED APPLICATION

This application is based upon and claims the benefit of priority of the prior Japanese Patent Application No. 2015-147260, filed on Jul. 24, 2015, the entire contents of which are incorporated herein by reference.

FIELD

The embodiments discussed herein are related to a technique for providing a service according to a specific place or range.

BACKGROUND

In recent years, a mechanism has been becoming popular in which a terminal set at a specific place (e.g. digital signage terminal) or a tag including a short-distance radio communication function (e.g. near field communication (NFC) tag) and a communication device possessed by a user carry out communications and thereby some kind of service is provided to this user. In this mechanism, by success in the communications between the terminal or tag and the communication device, the existence of this communication device in the radio communication range of the terminal or tag is proved. That is, this mechanism can provide some kind of service to the user of the communication device whose existence in a specific place or range is authenticated. Besides the case in which the communication device and the terminal or tag carry out short-distance radio communications, there is also the case in which the communication device reads information on the terminal or tag by using a camera or the like and thereby some kind of service is provided similarly.

For example, a service is known in which a visit of a user to a shop is authenticated and a privilege (point or coupon) that can be used in the shop is given to the user through reading of a quick response (QR) code (registered trademark) displayed on a terminal set in the shop by a communication device possessed by the user.

Furthermore, a grouping system that groups plural communication devices is known (for example, Japanese Laid-open Patent Publication No. 2015-65521). First, the plural communication devices acquire a unique identification (ID) from an NFC tag including the unique ID and transmit the acquired unique ID to a server. When receiving the unique ID from the plural communication devices, the server sets the communication devices that have transmitted the same unique ID as the same group. For example, this grouping system distributes the same information to the grouped communication devices.

SUMMARY

According to an aspect of the embodiment, a proxy authentication method executed by a communication device includes acquiring equipment identification information from equipment, the equipment identification identifying the equipment, transmitting the equipment identification information to a server that provides a service according to the equipment, receiving, from at least one of the server and the equipment, a condition relating to a range confined based on at least one of time and distance, and providing, based on the condition, at least one of the equipment identification information and a value relating to the equipment identification information to another communication device estimated to exist in the range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a data configuration example of a management information storing unit according to embodiment 1;

FIG. 5 illustrates a data configuration example of a condition information storing unit according to embodiment 1;

FIG. 6 illustrates a data configuration example of a group information storing unit according to embodiment 1;

FIG. 8 illustrates a data configuration example of a proxy authentication information storing unit according to embodiment 1;

FIG. 15 illustrates a data configuration example of a management information storing unit according to embodiment 2;

FIG. 17 illustrates a data configuration example of a proxy authentication information storing unit according to embodiment 2;

DESCRIPTION OF EMBODIMENTS

For example, in a system that gives a shop-visit point, if many users who desire to acquire the shop-visit point (enjoy a service) exist, users who wait to carry out operation for the point acquisition form a line in front of a terminal set in the shop in some cases. Furthermore, also in a grouping system, users to become objects of grouping form a line in front of an NFC tag in some cases.

As above, if there is a limit to the number of terminals set at a specific place or tags including a radio communication function, it often takes a long time for a user who desires to enjoy a service to carry out communications and so forth with the terminal or tag set at the specific place.

Here, for example, it is conceivable that a communication device X of a certain user A acquires a unique ID of an NFC tag by communicating with the NFC tag and then the communication device X provides the unique ID to a communication device Y of another user B. That is, another user B can acquire the unique ID via the communication device X without standing in a line in front of the NFC tag. Thus, the user of the communication device Y can enjoy a given service such as acquisition of a point or grouping by transmitting the unique ID acquired via the communication device X to a server.

However, if the certain communication device X blindly diffuses the unique ID acquired from the NFC tag or terminal to other communication devices Y, possibly the service that is to be provided to only users whose existence in the place or range in which the tag or terminal is set is authenticated is provided also to users who do not exist in the specific place or range.

For example, a result that a privilege that is to be given to only the user A who visits a shop is diffused even to the user B who does not visit the shop is possibly caused. Furthermore, in grouping, when only users who exist in a specific place or range are desired to be grouped, a result that even the user B who does not exist in the place or range is grouped is possibly caused.

Accordingly, in one aspect, the embodiments discussed herein intend to improve the convenience of users and provide a service according to a specific place or range to only users whose existence in the specific place or range is authenticated.

The detailed embodiments will be described below. It is to be noted that the following respective embodiments can be combined as appropriate in such a range as not to cause inconsistency in the contents of processing. The respective embodiments will be described below on the basis of the drawings.

Embodiment 1

Figure 1:
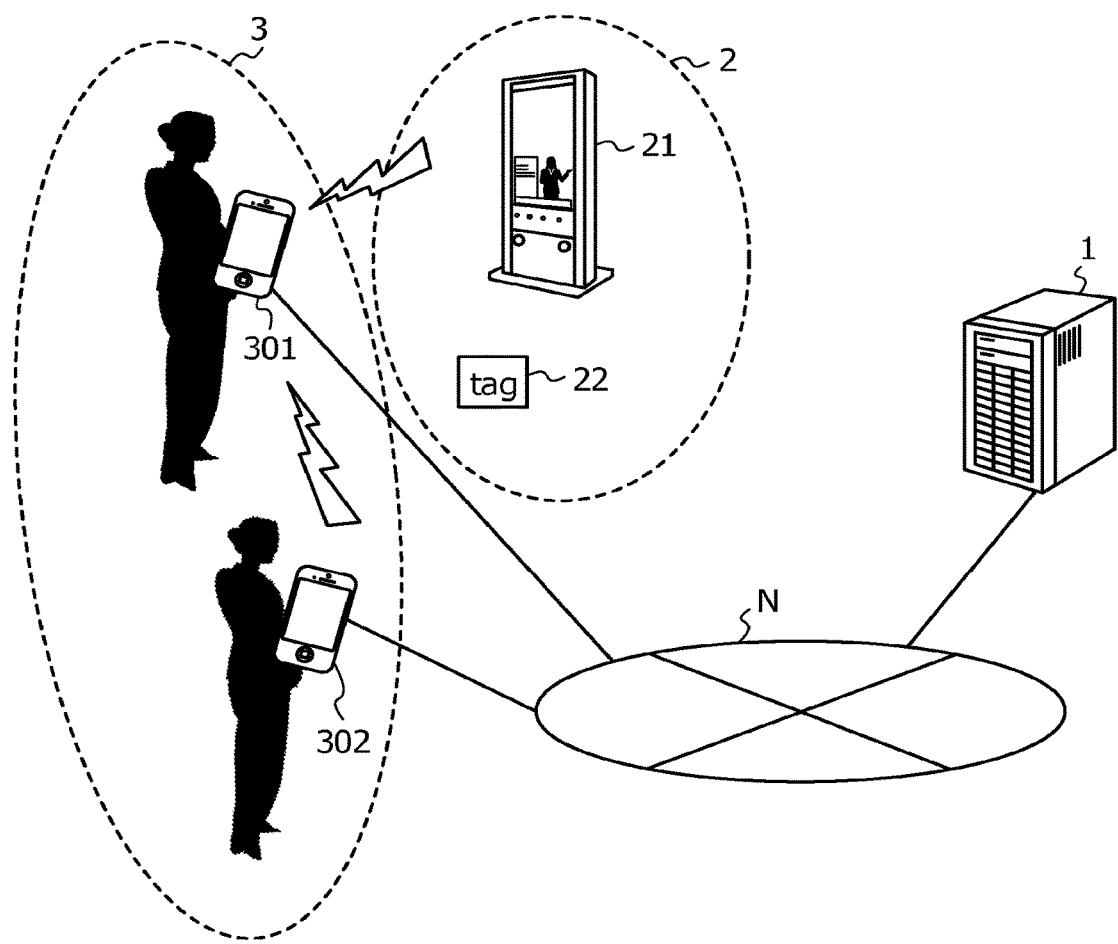
FIG. 1 is a configuration diagram of a service provision system according to embodiment 1.

FIG. 1 is a configuration diagram of a service provision system according to embodiment 1. The service provision system includes a server 1, site equipment 2 (terminal 21 or tag 22), and communication devices 3 (first communication device 301 and second communication device 302).

The server 1 is a computer that provides a specific service to the communication device 3 (for example, first communication device 301 or second communication device 302) of a user who exists at a specific place. The server 1 and the communication device 3 communicate via a network N such as a radio communication network or the Internet. Furthermore, the server 1 manages the site equipment 2.

The site equipment 2 is equipment set at the specific place and is the terminal 21 or the tag 22 for example. The terminal 21 is a computer set at the specific place and is a point giving terminal set in a shop or a digital signage terminal that displays an advertisement and so forth for example. The tag 22 is a tag that is set at the specific place and includes a radio communication function and is an NFC tag for example.

The site equipment 2 causes the communication device 3 to acquire equipment identification information to identify the site equipment 2 by any method in order to prove that the communication device 3 possessed by a user exists in the specific place or range. In other words, the communication device 3 that can acquire the equipment identification information is authenticated as a device that exists in the specific place or range.

For example, if the site equipment 2 is the terminal 21, in embodiment 1, a terminal ID to identify the terminal 21 is transmitted to the communication device 3 of a user by using a short-distance radio communication function. The terminal 21 may convert the terminal ID to information readable by the communication device 3, such as a QR code, and cause the communication device 3 to read the information. Furthermore, for example, if the site equipment 2 is the tag 22, in embodiment 1, the tag 22 transmits a tag ID to identify the tag 22 to the communication device 3 by using a radio communication function. The equipment identification information includes the tag ID and the terminal ID.

Next, the communication device 3 is a smartphone, a tablet computer, or the like possessed by the user and is the first communication device 301 or the second communication device 302. The communication device 3 accesses the server 1 via the network N and thereby the user enjoys a service according to the specific place.

In FIG. 1, the communication device 3 that acquires the equipment identification information from the site equipment 2 is the first communication device 301. That is, the first communication device 301 acquires the equipment identification information from the site equipment 2 and thereby the existence of the first communication device 301 in the specific place or range is authenticated. Then, the first communication device 301 transmits the acquired equipment identification information to the server 1 and thereby the user of the first communication device 301 can enjoy the specific service.

Moreover, under a given condition, instead of the site equipment 2, the first communication device 301 causes the second communication device 302 to acquire the equipment identification information acquired from the site equipment 2 or information relating to the equipment identification information. Hereinafter, the operation in which, under the given condition, a certain communication device 3 (for example, first communication device 301) causes another communication device 3 (for example, second communication device 302) to acquire the equipment identification information acquired from the site equipment 2 or the information relating to the equipment identification information instead of the site equipment 2 will be referred to as proxy authentication. The information relating to the equipment identification information will be described later.

Meanwhile, the communication device 3 that acquires the equipment identification information or the information relating to this equipment identification information via the first communication device 301 that is carrying out the proxy authentication is the second communication device 302. The second communication device 302 acquires the equipment identification information or the information relating to the equipment identification information from the first communication device 301 and thereby the existence of the second communication device 302 in the specific place or range is authenticated. Then, the second communication device 302 transmits the acquired equipment identification information to the server 1 and thereby the user of the second communication device 302 can enjoy the specific service.

Here, the given condition is a condition relating to a range confined on the basis of the time or distance. For example, that the elapsed time from acquisition of equipment identification information by the first communication device 301 is equal to or shorter than a given threshold, or that the movement distance from acquisition of equipment identification information by the first communication device 301 is equal to or shorter than a given threshold, or the like is employed as the condition. Furthermore, the given condition may be a condition relating to both elapsed time and movement distance.

Thus, as long as the given condition is satisfied, the first communication device 301 sets the function relating to the proxy authentication to the on-state to thereby cause the second communication device 302 to acquire the equipment identification information or information relating to the equipment identification information. On the other hand, if the given condition is not satisfied, the first communication device 301 sets the function relating to the proxy authentication to the off-state to thereby keep the equipment identification information or the information relating to the equipment identification information from being diffused any more to other communication devices by the proxy authentication function of the first communication device 301. That is, the users of the other communication devices are kept from enjoying the specific service by utilizing the proxy authentication function of the first communication device 301. The given condition is set as appropriate by an administrator of the server 1 according to the setting place of the site equipment 2 and the characteristics of the service to be provided.

Figure 2:
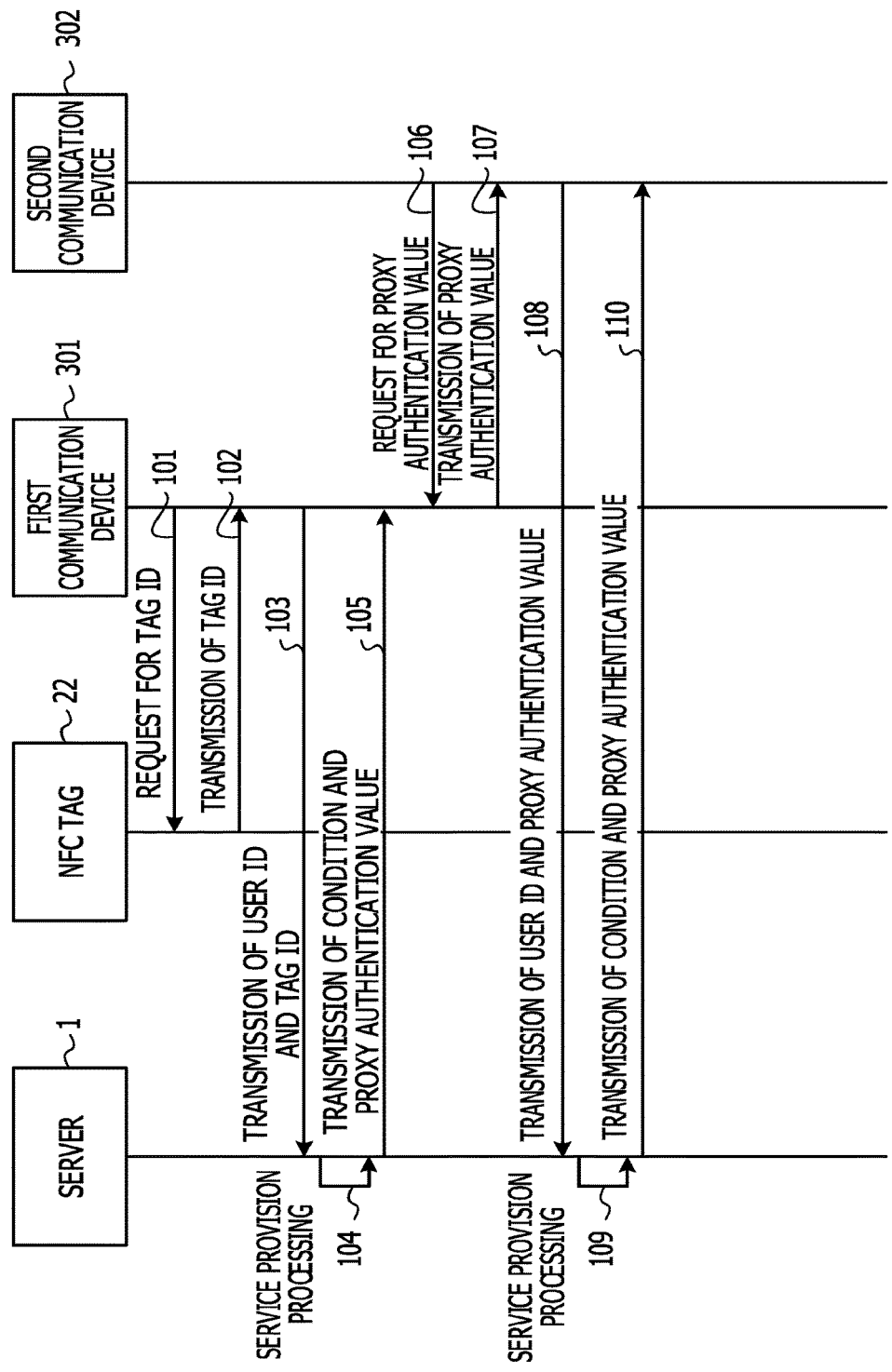
FIG. 2 is an outline diagram of a transaction according to embodiment 1.

FIG. 2 is an outline diagram of a transaction according to embodiment 1. It is to be noted that in FIG. 2, a description will be made by using the NFC tag 22 as the site equipment 2. First, the first communication device 301 requests the NFC tag 22 to transmit a tag ID by using a short-distance radio communication function (101). Then, the NFC tag 22 returns the tag ID to the first communication device 301 by using the short-distance radio communication function (102). The first communication device 301 transmits a user ID and the tag ID to the server 1 (103). Incidentally, the user ID is user identification information that is issued at the time of registration of use of a service and is to identify the user. The first communication device 301 may also transmit communication device identification information that is identification information of the communication device 3 in addition to the user ID.

The server 1 provides a specific service to the user corresponding to the user ID (104). For example, the server 1 adds given points to the number of points associated with the user ID. Furthermore, the server 1 carries out grouping by associating user IDs of users who have transmitted the same tag ID with each other.

Then, the server 1 transmits a given condition relating to proxy authentication and a proxy authentication value that is information relating to equipment identification information (105). The proxy authentication value is a value generated on the basis of the user ID of the first communication device 301 and the equipment identification information. The proxy authentication value is used to identify by which communication devices 3 (for example, first communication device 301) the second communication device 302 has received proxy authentication. Note that the server 1 may transmit not the proxy authentication value but the equipment identification information itself.

Next, the first communication device 301 that has received the given condition relating to proxy authentication and the proxy authentication value turns on the proxy authentication function. In addition, for example, the first communication device 301 starts measurement of the elapsed time or the movement distance and controls the proxy authentication function under the given condition.

Meanwhile, the second communication device 302 that desires the proxy authentication transmits a signal for requesting the proxy authentication value to the first communication device 301 by using the short-distance radio communication function (106). Then, if the proxy authentication function is in the on-state, the first communication device 301 transmits the proxy authentication value (107). The first communication device 301 turns off the proxy authentication function if the elapsed time or the movement distance surpasses a threshold under the given condition. Therefore, if the proxy authentication function is in the off-state, the transmission of the proxy authentication value in 107 is not carried out.

The second communication device 302 that has acquired the proxy authentication value transmits a user ID relating to the second communication device 302 and the proxy authentication value to the server 1 (108). The server 1 provides the specific service to the user identified on the basis of the user ID (109). Moreover, the server 1 transmits a condition for proxy authentication and a proxy authentication value also to the second communication device 302 authenticated by the proxy authentication (110).

Here, before transmitting the condition to the second communication device 302, the server 1 first requests the first communication device 301 to transmit the elapsed time or the movement distance from the acquisition of the tag ID. Then, the server 1 generates an updated condition obtained by applying the elapsed time or the movement distance to the initial given condition. Then, the server 1 transmits the updated condition to the second communication device 302 in addition to the proxy authentication value.

For example, if the initial given condition is that "the elapsed time is equal to or shorter than three minutes" and information of "two minutes" is received from the first communication device 301 as the elapsed time at the present timing, the updated condition is that "the elapsed time is equal to or shorter than one minute."

As described above, the second communication device 302 can acquire the tag ID from the first communication device 301 without acquiring the tag ID directly from the NFC tag 22. That is, the user of the second communication device 302 can also enjoy the service according to the specific place. Moreover, the first communication device 301 sets the proxy authentication function to the on-state only under the given condition. This can reduce provision of the service to other communication devices 3 that do not exist in the specific place or range.

Figure 3:
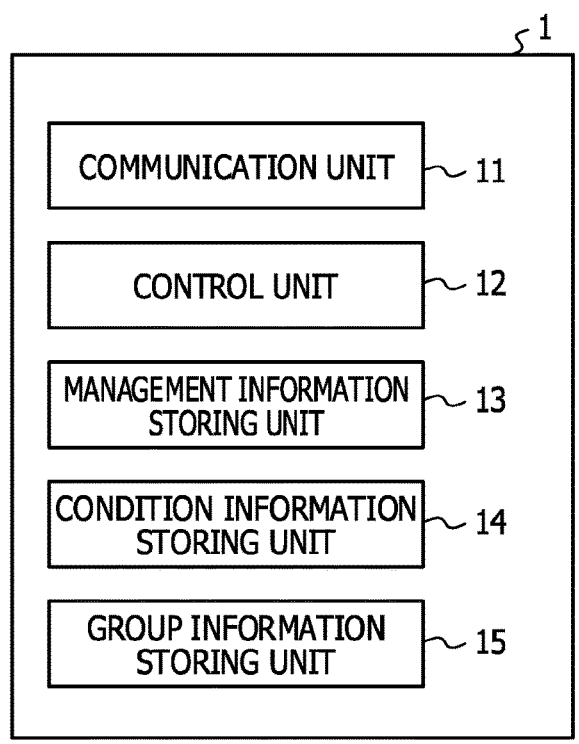
FIG. 3 is a functional block diagram of a server according to embodiment 1.

Next, the service provision system according to embodiment 1 will be described in more detail. FIG. 3 is a functional block diagram of a server according to embodiment 1. Incidentally, the server illustrated in FIG. 3 may be the server 1 illustrated in FIG. 1.

The server 1 includes a communication unit 11, a control unit 12, a management information storing unit 13, and a condition information storing unit 14. Furthermore, as a service, the server 1 illustrated in FIG. 2 groups plural users, and distributes similar information to the communication device 3 of each user in the group and causes the communication devices 3 to share a screen. Thus, the server 1 in the present embodiment further includes a group information storing unit 15.

The communication unit 11 communicates with the communication device 3. For example, the communication unit 11 receives a service request including equipment identification information or a proxy authentication value from the communication device 3. The service request is a request to ask for provision of a service according to a specific place and includes a user ID besides the equipment identification information or the proxy authentication value in order to identify the user to which the service is to be provided.

The control unit 12 controls various kinds of processing of the whole of the server 1. For example, the control unit 12 provides a specific service to the communication device 3 whose existence in a specific place or range is authenticated. Through reception of equipment identification information or a proxy authentication value from the communication device 3, the communication device 3 is regarded as a device whose existence at the specific place is authenticated.

The management information storing unit 13 stores management information. The management information is information for managing the communication devices 3 that have accessed the server 1. FIG. 4 illustrates a data configuration example of the management information storing unit according to embodiment 1. The management information storing unit 13 stores a user ID, a unique value, a tag ID, a received proxy authentication value, and a transmitted proxy authentication value in association with each other.

The user ID is a user ID received from the communication device 3. The user ID is notified to the server 1 in 103 or 108 in FIG. 2, for example. Furthermore, ahead of 101 or 106, the user ID may be notified from the communication device 3 to the server 1 when a session is established with the server 1.

The unique value is identification information that is valid only in an established session and is generated according to the user ID and a session ID for example. For example, the server 1 may generate the unique value that is valid in the relevant session on the basis of the user ID, and identify the user by using the unique value instead of the user ID in this session. Thus, if the unique value is generated, the unique value is stored in association with the user ID.

The tag ID is one example of equipment identification information and is stored for example if the tag ID is transmitted from the communication device 3 to the server 1 in 103 in FIG. 2.

The received proxy authentication value is a proxy authentication value acquired by the second communication device 302 from the first communication device 301 whose proxy authentication function is in the on-state, and is stored if the server 1 receives this proxy authentication value from the second communication device 302 (108 in FIG. 2).

In the example of FIG. 4, if the server 1 receives a proxy authentication value "yyyy1" from the second communication device 302 corresponding to a user ID "002" (or unique value "xxxx2"), the control unit 12 associates the received proxy authentication value "yyyy1" with the user ID "002" (or unique value "xxxx2") and stores the proxy authentication value "yyyy1" in the received proxy authentication value.

In the example of FIG. 4, the first communication device 301 corresponding to a user ID "001" (or unique value "xxxx1") directly acquires a tag ID "tag1" from the NFC tag 22 and transmits the tag ID "tag1" to the server 1. Thus, the server 1 does not receive a proxy authentication value from the first communication device 301. Therefore, the received proxy authentication value of the record relating to the user ID "001" (or unique value "xxxx1") is "Null."

Next, the transmitted proxy authentication value is a proxy authentication value transmitted to the communication device 3 in addition to a condition (105 or 110 in FIG. 2). The transmitted proxy authentication value is generated by the control unit 12 ahead of 105 or 110 in FIG. 2, and is associated with the user ID and unique value of the communication device 3 of the transmission target and is stored in the management information storing unit 13.

In the example of FIG. 4, the control unit 12 generates a value "yyyy1" that is unique in order to transmit a proxy authentication value to the first communication device 301 corresponding to the user ID "001" (or unique value "xxxx1"). Then, the control unit 12 associates the generated proxy authentication value "yyyy1" with the user ID "001" (or unique value "xxxx1") and stores the proxy authentication value "yyyy1" in the management information storing unit 13 as the transmitted proxy authentication value.

Moreover, if the server 1 transmits a proxy authentication value also to the second communication device 302, a proxy authentication value "yyyy2" newly generated is stored in the management information storing unit 13. The proxy authentication value is a value that is unique and is generated on the basis of the user ID and the tag ID or the received proxy authentication value for example.

Here, the case in which the second communication device 302 acquires the proxy authentication value from the first communication device 301 will be described. The second communication device 302 transmits a service request including the user ID "002" (or unique value "xxxx2") and the proxy authentication value "yyyy1" to the server 1.

The control unit 12 of the server 1 that has received the service request newly generates a record of the user ID "002" (or unique value "xxxx2") and stores "yyyy1" as the received proxy authentication value in association with the user ID "002" (or unique value "xxxx2").

Furthermore, the control unit 12 identifies the record having "yyyy1" as the transmitted proxy authentication value. If the tag ID is "Null" in the record having "yyyy1" as the transmitted proxy authentication value, the control unit 12 employs the value of the received proxy authentication value in the identified record as a key and further executes the processing of searching for the record having this value as the transmitted proxy authentication value.

In the example of FIG. 4, the control unit 12 acquires the tag ID "tag1" and the user ID "001" (or unique value "xxxx1") from the record having "yyyy1" as the transmitted proxy authentication value. Then, the control unit 12 provides the service according to the tag ID to the second communication device 302 and acquires the given condition according to the tag ID from the condition information storing unit 14 to be described later. Moreover, before transmitting the condition to the second communication device 302, the control unit 12 acquires the latest elapsed time or movement distance from the first communication device 301 corresponding to the user ID "001" (or unique value "xxxx1") and updates the condition to transmit the updated condition to the second communication device 302.

Next, the condition information storing unit 14 in FIG. 3 stores information relating to the condition to be transmitted to the communication device 3. FIG. 5 illustrates a data configuration example of the condition information storing unit according to embodiment 1. The condition information storing unit 14 associates and stores the tag ID and the condition.

In the example of FIG. 5, for example regarding the NFC tag 22 corresponding to the tag ID "tag1," the communication device 3 can cause another communication device 3 to acquire a proxy authentication value as long as "the elapsed time is equal to or shorter than three minutes" from setting of the proxy authentication function to the on-state in the communication device 3.

If the control unit 12 receives a service request including the tag ID "tag1" from the first communication device 301, the control unit 12 provides the service and acquires the condition that "the elapsed time is equal to or shorter than three minutes" corresponding to the tag ID "tag1" from the condition information storing unit 14. Then, the control unit 12 controls the communication unit 11 to transmit the condition to the first communication device 301.

Moreover, when receiving a service request including the proxy authentication value "yyyy1" from the second communication device 302, the control unit 12 refers to the management information storing unit 13 and acquires the tag ID "tag1" and the user ID "001" (or unique value "xxxx1") from the record having "yyyy1" as the transmitted proxy authentication value.

Then, the control unit 12 acquires the condition that "the elapsed time is equal to or shorter than three minutes" corresponding to the tag ID "tag1" from the condition information storing unit 14. Moreover, the control unit 12 controls the communication unit 11 to ask the first communication device 301 corresponding to the user ID "001" to transmit the latest elapsed time. For example, when acquiring "two minutes" as the latest elapsed time, the control unit 12 changes the condition that "the elapsed time is equal to or shorter than three minutes" corresponding to the tag ID "tag1" to a condition that "the elapsed time is equal to or shorter than one minute," and then transmits the updated condition to the second communication device 302.

Next, the group information storing unit 15 in FIG. 3 stores information of grouped users. FIG. 6 illustrates a data configuration example of the group information storing unit according to embodiment 1. The group information storing unit 15 associates and stores the tag ID and group members.

In the example of FIG. 6, a user relating to the communication device 3 (first communication device 301) that has acquired the tag ID "tag1" from the NFC tag 22 and a user relating to the communication device 3 (second communication device 302) that has acquired a proxy authentication value relating to the tag ID "tag1" from the communication device 3 whose proxy authentication function is in the on-state are grouped as the same group. For example, by the control unit 12, the user of the user ID "001" and the user of the user ID "002" are managed as members of a group relating to the tag ID "tag1."

Figure 7:
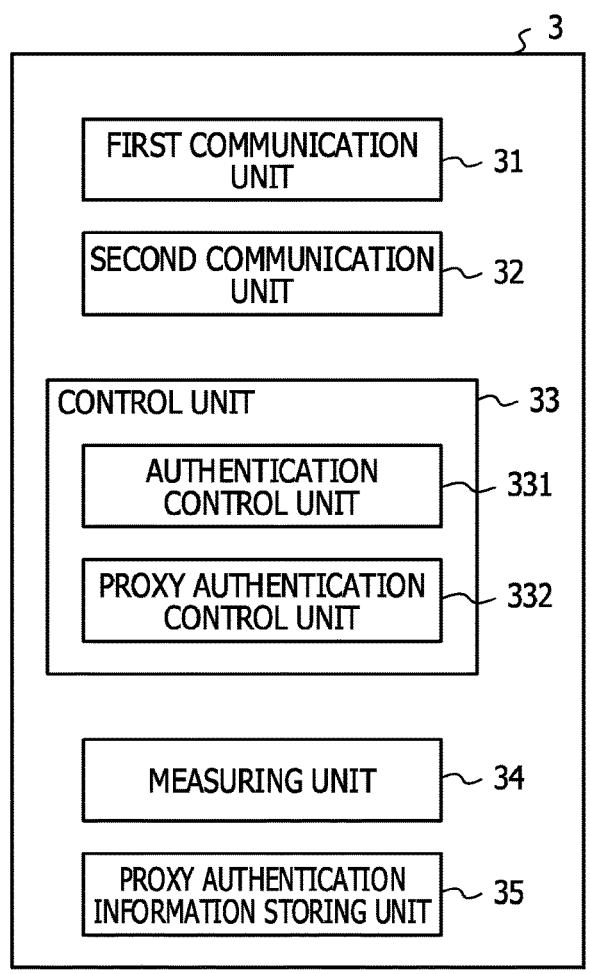
FIG. 7 is a functional block diagram of a communication device according to embodiment 1.

FIG. 7 is a functional block diagram of a communication device according to embodiment 1. Incidentally, the communication device illustrated in FIG. 7 may be the communication device 3 illustrated in FIG. 1. The communication device 3 in FIG. 7 functions as the first communication device 301 or the second communication device 302.

The communication device 3 includes a first communication unit 31, a second communication unit 32, a control unit 33, a measuring unit 34, and a proxy authentication information storing unit 35. The first communication unit 31 communicates with the server 1 via the network N. For example, the first communication unit 31 acquires a unique value, condition information, and a proxy authentication value from the server 1.

The second communication unit 32 carries out communications based on short-distance radio communications with the site equipment 2. For example, the second communication unit 32 acquires a tag ID from the NFC tag 22. However, the second communication unit 32 is unnecessary in the case of a system in which the communication device 3 reads a QR code displayed on the site equipment 2. The communication device 3 includes a photographing unit (not illustrated) and a display unit (not illustrated) instead of the second communication unit 32.

In the case of a system in which the tag ID is acquired and if the communication device 3 functions as the first communication device 301, the second communication unit 32 transmits a proxy authentication value to the second communication device 302. Moreover, if the communication device 3 functions as the second communication device 302, the second communication unit 32 receives a proxy authentication value from the first communication device 301.

Furthermore, in the case of the system in which the communication device 3 carries out reading and if the communication device 3 functions as the first communication device 301, the photographing unit photographs an image including a QR code displayed on the site equipment 2 and inputs the image to the control unit 33. Moreover, when the proxy authentication function is executed, an image including a QR code generated by the control unit 33 is displayed on the display unit. Furthermore, if the communication device 3 functions as the second communication device 302, the photographing unit photographs an image including a QR code displayed on the first communication device 301 and inputs the image to the control unit 33.

The control unit 33 controls the respective kinds of processing of the whole of the communication device 3. The control unit 33 further includes an authentication control unit 331 and a proxy authentication control unit 332. The authentication control unit 331 authenticates the existence of the communication device 3 in a specific place or range by acquiring equipment identification information such as a tag ID or a proxy authentication value. Then, the authentication control unit 331 controls the first communication unit 31 to transmit a service request including the equipment identification information or the proxy authentication value to the server 1 and thereby request the server 1 to provide a specific service.

The proxy authentication control unit 332 controls whether the proxy authentication function is in the on-state or the off-state. In addition, if the proxy authentication function is in the on-state, the proxy authentication control unit 332 controls the second communication unit 32 to cause a proxy authentication value to be acquired by another communication device 3. For example, the proxy authentication control unit 332 turns on the proxy authentication function at the timing when a condition is acquired from the server 1, and turns off the proxy authentication function at the timing when the condition becomes unsatisfied. Furthermore, if the proxy authentication function is in the on-state, the proxy authentication control unit 332 controls the second communication unit 32 to cause another communication device 3 to acquire a proxy authentication value.

The measuring unit 34 measures the elapsed time or the movement distance. For example, the measuring unit 34 is a timer that measures the elapsed time from the timing when the proxy authentication function is turned on. Furthermore, the measuring unit 34 is an acceleration sensor that measures the movement distance from the timing when the proxy authentication function is turned on.

The proxy authentication information storing unit 35 stores proxy authentication information for proxy authentication. FIG. 8 illustrates a data configuration example of the proxy authentication information storing unit according to embodiment 1. The proxy authentication information storing unit 35 associates and stores the proxy authentication value and the condition. Moreover, the proxy authentication information storing unit 35 may associate and store the unique value acquired from the server 1.

In the example of FIG. 8, the proxy authentication value "yyyy1" and information of the condition that "the elapsed time is equal to or shorter than three minutes" are stored as the proxy authentication information.

Figure 9:
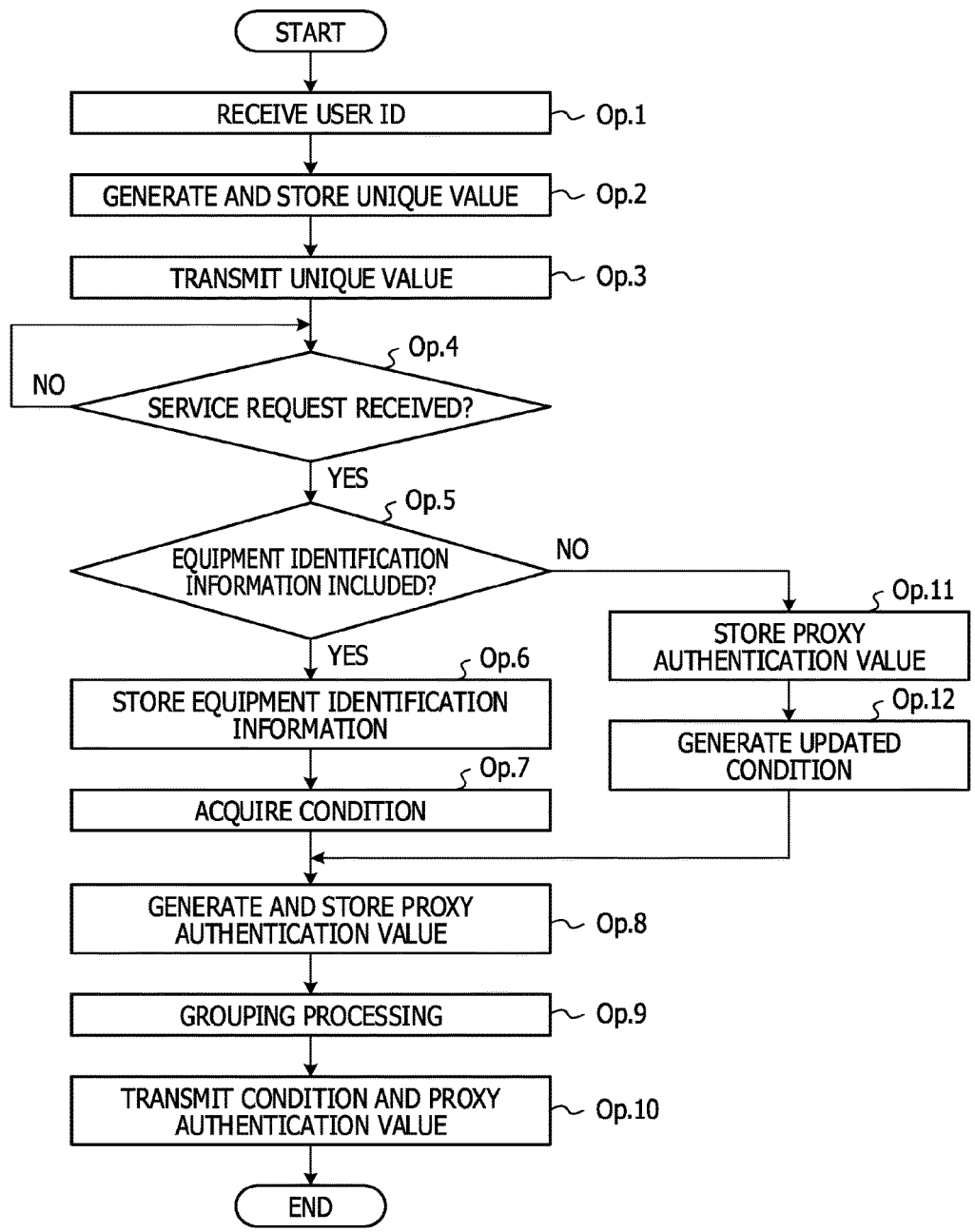
FIG. 9 is a flowchart of service provision processing in a server according to embodiment 1.

Next, the flow of processing of each device will be described. FIG. 9 is a flowchart of service provision processing in the server according to embodiment 1. The communication unit 11 receives a user ID from the communication device 3 (Op.1). Then, the control unit 12 generates a unique value and associates the generated unique value with the user ID to store the unique value in the management information storing unit 13 (Op.2). Under control by the control unit 12, the communication unit 11 transmits the unique value to the communication device 3 (Op.3).

The control unit 12 determines whether or not the communication unit 11 has received a service request from the communication device 3 (Op.4). Note that the service request includes either one of equipment identification information and a proxy authentication value and includes the unique value (or user ID). The service request including equipment identification information is a service request transmitted by the communication device 3 when the communication device 3 directly acquires the equipment identification information from the site equipment 2. Furthermore, the service request including a proxy authentication value is a service request transmitted by the communication device 3 when the communication device 3 acquires the proxy authentication value from another communication device 3 whose proxy authentication function is in the on-state.

If the service request has not been received (NO of Op.4), the control unit 12 waits without any operation. On the other hand, if the service request has been received (YES of Op.4), the control unit 12 determines whether equipment identification information is included in the service request (Op.5).

If the service request includes equipment identification information (YES of Op.5), the control unit 12 searches for the record having the unique value included in the service request from the management information storing unit 13. Then, the control unit 12 stores the equipment identification information (tag ID) included in the service request in this record (Op.6). Moreover, the control unit 12 employs this equipment identification information (tag ID) as a key and acquires the corresponding condition from the condition information storing unit 14 (Op.7).

On the other hand, if the service request does not include equipment identification information (NO of Op.5), the control unit 12 searches for the record having the unique value included in the service request from the management information storing unit 13. Then, the control unit 12 stores the proxy authentication value included in the service request in the received proxy authentication value of the record (Op.11).

Moreover, the control unit 12 generates an updated condition (Op.12). For example, the control unit 12 identifies the record having the proxy authentication value included in the service request as the transmitted proxy authentication value, and acquires equipment identification information (tag ID) and a user ID in this record. Then, the control unit 12 controls the communication unit 11 to ask the communication device 3 corresponding to the user ID to transmit the latest measurement value. The control unit 12 generates the updated condition by updating a condition acquired from the condition information storing unit 14 on the basis of the relevant equipment identification information (tag ID) according to the latest measurement value acquired in advance.

After the end of Op.7 or Op.12, the control unit 12 generates a proxy authentication value and stores the generated proxy authentication value in the transmitted proxy authentication value of the management information storing unit 13 in association with the unique value included in the service request received in Op.4 (Op.8). Moreover, the control unit 12 executes grouping processing (Op.9). That is, provision of a service according to a specific place or range is carried out.

For example, the control unit 12 stores the user ID identified from the unique value in the group information storing unit 15 in association with the equipment identification information (tag ID).

Then, under control by the control unit 12, the communication unit 11 transmits, to the communication device 3, the condition acquired in Op.7 or the updated condition generated in Op.12 and the proxy authentication value generated in Op.8 (Op.10). Then, the server 1 ends the series of processing.

Figure 10:
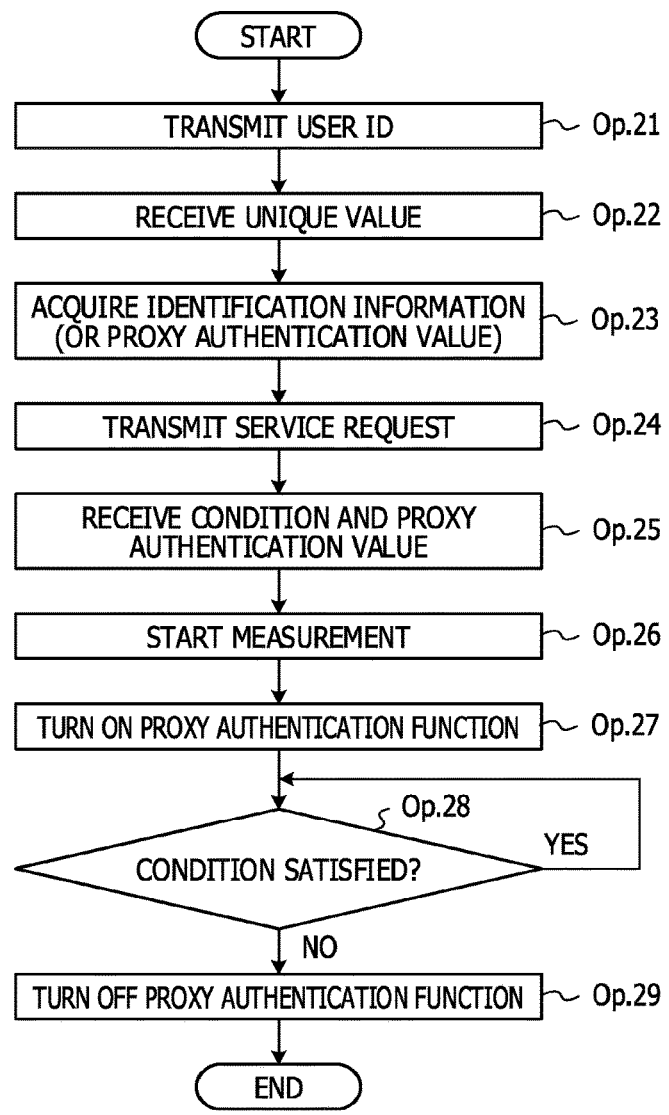
FIG. 10 is a flowchart of service request processing and proxy authentication processing in a communication device according to embodiment 1.

Next, FIG. 10 is a flowchart of service request processing and proxy authentication processing in the communication device according to embodiment 1. First, ahead of the processing of FIG. 10, the control unit 33 activates an application in response to an instruction from a user. The specific application may be an individual application on a service-by-service basis or may be a general-purpose application that manages enjoyment of plural services. In response to the activation of the application, the control unit 33 establishes a session between the communication device 3 and the server 1.

After the session is established, the first communication unit 31 transmits a user ID to the server 1 under control by the control unit 33 (Op.21). Then, the first communication unit 31 acquires a unique value from the server 1 (Op.22). The unique value acquired here is temporarily held until the session is disconnected.

Next, the second communication unit 32 acquires equipment identification information from the site equipment 2 (Op.23). Alternatively, the second communication unit 32 acquires a proxy authentication value from another communication device 3 whose proxy authentication function is in the on-state (Op.23). In the case of acquiring the equipment identification information or the proxy authentication value by a short-distance radio communication function, the second communication unit 32 requests the site equipment 2 or another communication device 3 to transmit the equipment identification information or the proxy authentication value ahead of Op.23.

Then, under control by the control unit 33, the first communication unit 31 transmits a service request including the equipment identification information or the proxy authentication value acquired in Op.23 and the unique value to the server 1 (Op.24).

Subsequently, the first communication unit 31 receives a given condition and a proxy authentication value from the server 1 (Op.25). If the communication device 3 is the first communication device 301, the condition is the initial condition acquired by the server 1 in Op.7. On the other hand, if the communication device 3 is the second communication device 302, the condition is the updated condition generated by the server 1 in Op.12.

Moreover, the measuring unit 34 starts measurement under control by the control unit 33 (Op.26). For example, the measuring unit 34 starts measurement of the elapsed time if the condition is a condition relating to the elapsed time. Furthermore, the measuring unit 34 starts measurement of the movement distance if the condition is a condition relating to the movement distance. Then, along with the start of the measurement, the control unit 33 sets the proxy authentication function to the on-state (Op.27).

Next, every given time, the control unit 33 acquires a measurement value from the measuring unit 34 and determines whether or not the condition is satisfied (Op.28). For example, the control unit 33 determines that the condition is satisfied if the condition is that "the elapsed time is equal to or shorter than three minutes" and the measurement value (elapsed time) acquired from the measuring unit 34 is two minutes.

If the condition is satisfied (YES of Op.28), the control unit 33 waits without any operation. On the other hand, if the condition is not satisfied (NO of Op.28), the control unit 33 turns off the proxy authentication function (Op.29). That is, the communication device 3 may not carry out the proxy authentication from then on.

Figure 11:
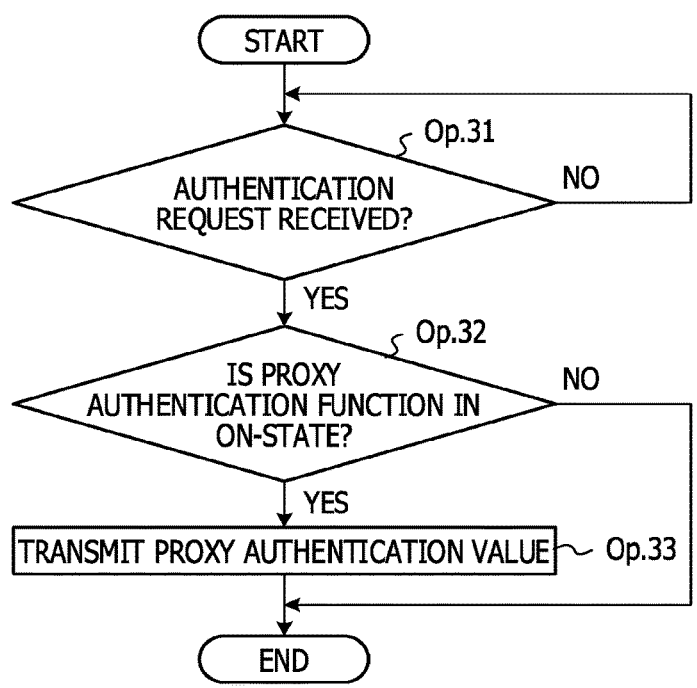
FIG. 11 is a flowchart of the case in which an authentication request is received.

Here, the case in which the communication device 3 receives an authentication request from another communication device 3 will be described. FIG. 11 is a flowchart of the case in which an authentication request is received. For example, the authentication request may be a session request of short-distance radio communications between the communication devices 3 or may be a request given and received separately after session establishment.

First, the control unit 33 determines whether or not the second communication unit 32 has received an authentication request from the second communication unit 32 of another communication device 3 (Op.31). If an authentication request has not been received (NO of Op.31), the control unit 33 waits without any operation.

On the other hand, if the second communication unit 32 has received an authentication request from the second communication unit 32 of another communication device 3 (YES of Op.31), the control unit 33 determines whether the proxy authentication function is in the on-state (Op.32). If the proxy authentication function is in the on-state (YES of Op.32), the second communication unit 32 transmits a proxy authentication value to the other communication device 3 under control by the control unit 33 (Op.33). Note that if the proxy authentication function is not in the on-state (NO of Op.32), the control unit 33 ends the series of processing illustrated in FIG. 11.

As described above, the communication device 3 according to embodiment 1 carries out the proxy authentication, which exempts other communication devices 3 from directly communicating with the site equipment 2. That is, the communication device 3 can authenticate the existence of other communication devices 3 in a specific place or range other than the vicinity of the site equipment 2. This improves the convenience of users.

Moreover, the on-state of the proxy authentication function is limited under a condition relating to a range confined on the basis of the time or distance. Thus, the present embodiment reduces erroneous authentication of another communication device 3 that does not exist at the specific place. This can keep the server 1 from providing a service to another communication device 3 that does not exist at the specific place.

Modification Examples of Embodiment 1

Although it is explained that the server 1 manages the given condition, the site equipment 2 may manage the given condition. That is, the site equipment 2 may output the condition to the communication device 3. For example, when acquiring equipment identification information from the site equipment 2, the first communication device 301 may acquire also the condition in conjunction with the equipment identification information.

Furthermore, in embodiment 1, the equipment identification information (tag ID or terminal ID) may be used as it is instead of the proxy authentication value. For example, in 105 and the subsequent operations in FIG. 2, the tag ID is used instead of the proxy authentication value. The server 1 executes service provision processing according to the tag ID acquired from the second communication device 302.

Embodiment 2

Figure 12:
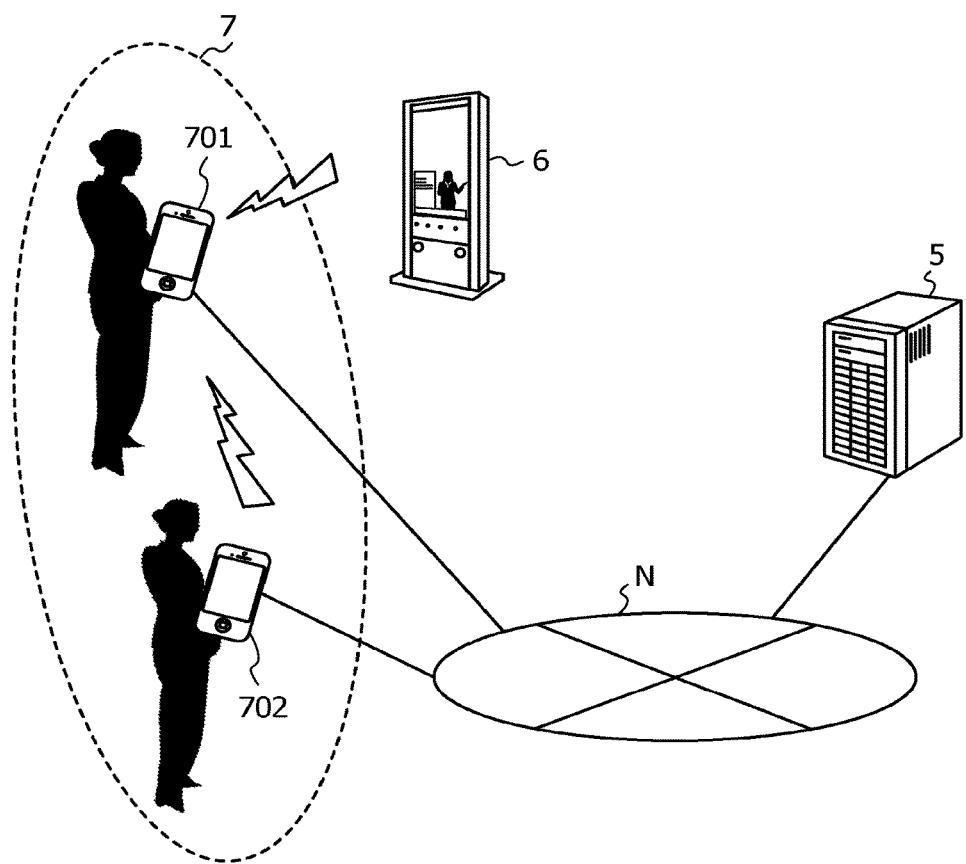
FIG. 12 is a configuration diagram of a service provision system according to embodiment 2.

FIG. 12 is a configuration diagram of a service provision system according to embodiment 2. The service provision system includes a server 5, site equipment 6, a first communication device 701, and a second communication device 702.

The server 5 is a computer that provides a specific service to a communication device 7 (for example, first communication device 701 or second communication device 702) of a user who exists at a specific place. The server 5 and the communication device 7 communicate via a network N such as a radio communication network or the Internet. Furthermore, the server 5 manages the site equipment 6.

The site equipment 6 is a computer set at the specific place and is a terminal set in a shop or a digital signage terminal that displays an advertisement and so forth for example. In embodiment 2, the site equipment 6 acquires a user ID or a unique value from the communication device 7 of a user. The unique value is a value generated by the server 5 on the basis of the user ID and a value different on each session basis is used as with embodiment 1.

For example, the site equipment 6 receives a user ID or a unique value from the first communication device 701 by using a short-distance radio communication function. Alternatively, the site equipment 6 reads a QR code displayed on the first communication device 701 and extracts the user ID or the unique value from the QR code. Furthermore, in embodiment 2, the site equipment 6 transmits, to the server 5, equipment identification information (terminal ID) to identify the site equipment 6 together with the user ID or the unique value, and thereby proves that the communication device 7 corresponding to the user ID or the unique value exists at the specific place.

Next, the communication device 7 is a smartphone, a tablet computer, or the like possessed by the user and is the first communication device 701 or the second communication device 702. In FIG. 12, the first communication device 701 transmits the user ID or unique value of the self-device to the site equipment 6 and causes the site equipment 6 to relay the user ID or the unique value to the server 5. The user of the first communication device 701 thereby enjoys a service according to the specific place.

Moreover, instead of the site equipment 6, the first communication device 701 relays a user ID or a unique value acquired from another communication device 7 (for example, second communication device 702) to the server 5 and thereby carries out proxy authentication of the existence of the other communication device 7 at the specific place. Furthermore, the user of the second communication device 702 enjoys the service according to the specific place by causing the first communication device 701 whose proxy authentication function is in the on-state to relay the user ID or unique value of the self-device to the server 5. The proxy authentication is carried out under a given condition as with embodiment 1.

Figure 13:
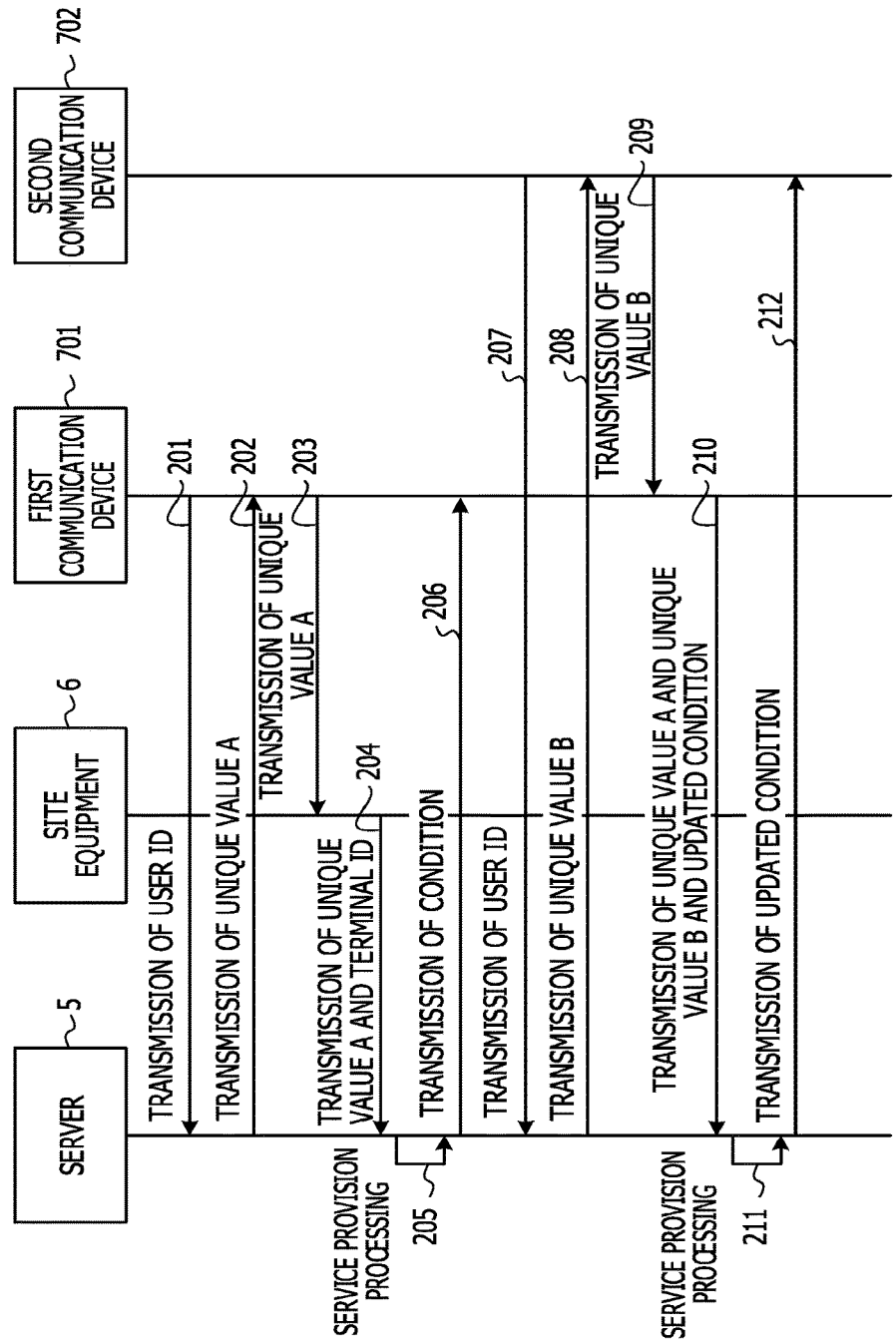
FIG. 13 is an outline diagram of a transaction according to embodiment 2.

FIG. 13 is an outline diagram of a transaction according to embodiment 2. First, the first communication device 701 transmits a user ID to the server 5 (201). Then, the server 5 returns a unique value A generated on the basis of the user ID to the first communication device 701 (202). Next, the first communication device 701 transmits the unique value A to the site equipment 6 (203). In the case of the QR code, the user puts a screen on which a QR code is displayed in the photographing range of a camera of the site equipment 6 and thereby the site equipment 6 acquires the unique value A.

Next, the site equipment 6 transmits a service request to the server 5 (204). Note that the service request transmitted from the site equipment 6 in 204 includes the acquired unique value A and equipment identification information (terminal ID).

When receiving the service request, the server 5 identifies the user ID on the basis of the unique value A and provides a specific service to the user corresponding to this user ID (205). Then, the server 5 transmits a given condition relating to proxy authentication to the first communication device 701 (206).

Meanwhile, the second communication device 702 that desires provision of the service transmits the user ID of the self-device to the server 5 as with 201 (207). Then, the server 5 returns a unique value B generated on the basis of the user ID to the second communication device 702 (208). Next, the second communication device 702 transmits a unique value B to the first communication device 701 (209).

If the proxy authentication function is in the on-state, the first communication device 701 transmits a service request to the server 5 (210). The service request transmitted in 210 includes the unique value B acquired from the other communication device 7 (second communication device 702), the unique value A of the self-device (first communication device 701), and an updated condition. The updated condition is a condition obtained by reflecting the latest elapsed time or movement distance in the initial condition acquired in 206. For example, if the initial condition acquired in 206 is that "the elapsed time is equal to or shorter than three minutes" and the elapsed time at the present timing is "two minutes," the first communication device 701 updates the condition to that "the elapsed time is equal to or shorter than one minute" and transmits the updated condition to the server 5.

Then, the server 5 identifies the user ID on the basis of the unique value B and provides the specific service to the user corresponding to this user ID (211). Then, the server 5 transmits the updated condition to the second communication device 702 (212).

As described above, the user of the second communication device 702 can enjoy the service according to the specific place without causing the site equipment 6 to acquire the user ID or unique value of the self-device. Moreover, the first communication device 701 can set the proxy authentication function to the on-state only in the range of the given condition. This can reduce provision of the service to other communication devices 7 that do not exist in the specific place or range.

Figure 14:
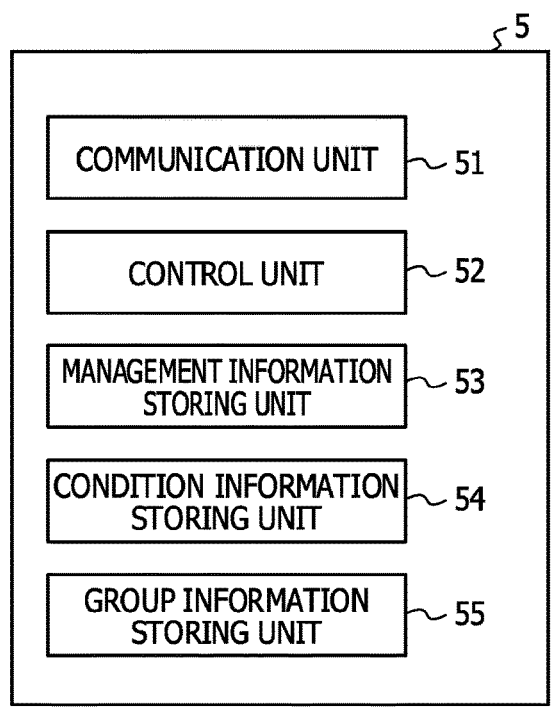
FIG. 14 is a functional block diagram of a server according to embodiment 2.

FIG. 14 is a functional block diagram of a server according to embodiment 2. Note that the server illustrated in FIG. 14 may be the server 5 illustrated in FIG. 12. The server 5 includes a communication unit 51, a control unit 52, a management information storing unit 53, a condition information storing unit 54, and a group information storing unit 55. The communication unit 51 communicates with the communication device 7. The control unit 52 controls various kinds of processing of the whole of the server 5. For example, the control unit 52 provides a specific service to the communication device 7 whose existence at a specific place is authenticated.

The management information storing unit 53 stores management information. The management information is information for managing the communication devices 7 that have accessed the server 5.

FIG. 15 illustrates a data configuration example of the management information storing unit according to embodiment 2. The management information storing unit 53 stores a user ID, a unique value, and equipment identification information (terminal ID) in association with each other. In the example of FIG. 15, for example, when the communication unit 51 receives a user ID "001," the control unit 52 generates a unique value "xxxx1" on the basis of the user ID "001" and stores the unique value "xxxx1" in association with the user ID "001."

Moreover, if the site equipment 6 transmits the unique value "xxxx1" and a terminal ID "terminal 1" in 204 in FIG. 13, the control unit 52 of the server 5 identifies the record having the unique value "xxxx1" in the management information storing unit 53 and stores the acquired terminal ID "terminal 1" in this record.

Next, the condition information storing unit 54 in FIG. 14 stores information relating to a condition under which the proxy authentication function in the communication device 7 is given. A data configuration example of the condition information storing unit 54 is similar to that of FIG. 5. However, in embodiment 2, the terminal ID is used instead of the tag ID.

The group information storing unit 55 stores information on grouped users. A data configuration example of the group information storing unit 55 is similar to that of FIG. 6. However, in embodiment 2, the terminal ID is used instead of the tag ID.

Figure 16:
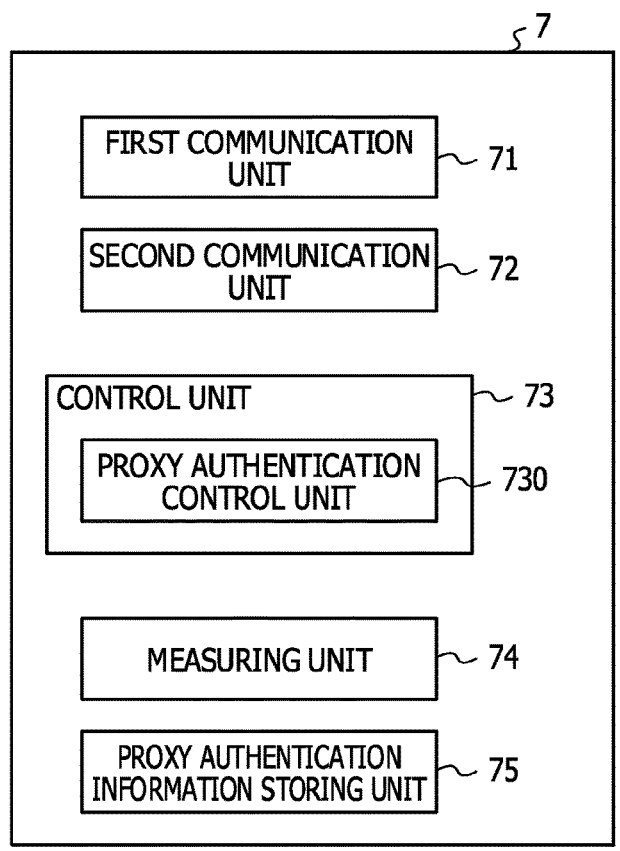
FIG. 16 is a functional block diagram of a communication device according to embodiment 2.

FIG. 16 is a functional block diagram of a communication device according to embodiment 2. It is to be noted that the communication device illustrated in FIG. 16 may be the communication device 7 illustrated in FIG. 12. The communication device 7 in FIG. 16 functions as the first communication device 701 or the second communication device 702.

The communication device 7 includes a first communication unit 71, a second communication unit 72, a control unit 73, a measuring unit 74, and a proxy authentication information storing unit 75. The first communication unit 71 communicates with the server 5 via the network N. For example, the first communication unit 71 acquires a unique value and condition information from the server 5.

The second communication unit 72 carries out communications based on short-distance radio communications with the site equipment 6. For example, the second communication unit 72 transmits a unique value to the site equipment 6. Furthermore, if the communication device 7 functions as the first communication device 701, the second communication unit 72 receives a unique value from the second communication device 702. Moreover, if the communication device 7 functions as the second communication device 702, the second communication unit 72 transmits a unique value to the first communication device 701.

The control unit 73 controls various kinds of processing of the whole of the communication device 7. The control unit 73 further includes a proxy authentication control unit 730. The proxy authentication control unit 730 controls whether the proxy authentication function is in the on-state or the off-state. In addition, if the proxy authentication function is in the on-state, the proxy authentication control unit 730 controls the second communication unit 72 to acquire a unique value from another communication device 7. For example, the proxy authentication control unit 730 turns on the proxy authentication function at the timing when a condition is acquired from the server 5, and turns off the proxy authentication function at the timing when the condition becomes unsatisfied.

The measuring unit 74 measures the elapsed time or the movement distance. For example, the measuring unit 74 is a timer that measures the elapsed time from the timing when the proxy authentication function is turned on. Furthermore, the measuring unit 74 is an acceleration sensor that measures the movement distance from the timing when the proxy authentication function is turned on.

The proxy authentication information storing unit 75 stores proxy authentication information for proxy authentication. FIG. 17 illustrates a data configuration example of the proxy authentication information storing unit according to embodiment 2. The proxy authentication information storing unit 75 stores the condition acquired from the server 5. Moreover, the proxy authentication information storing unit 75 may store the unique value in association with the condition.

Figure 18:
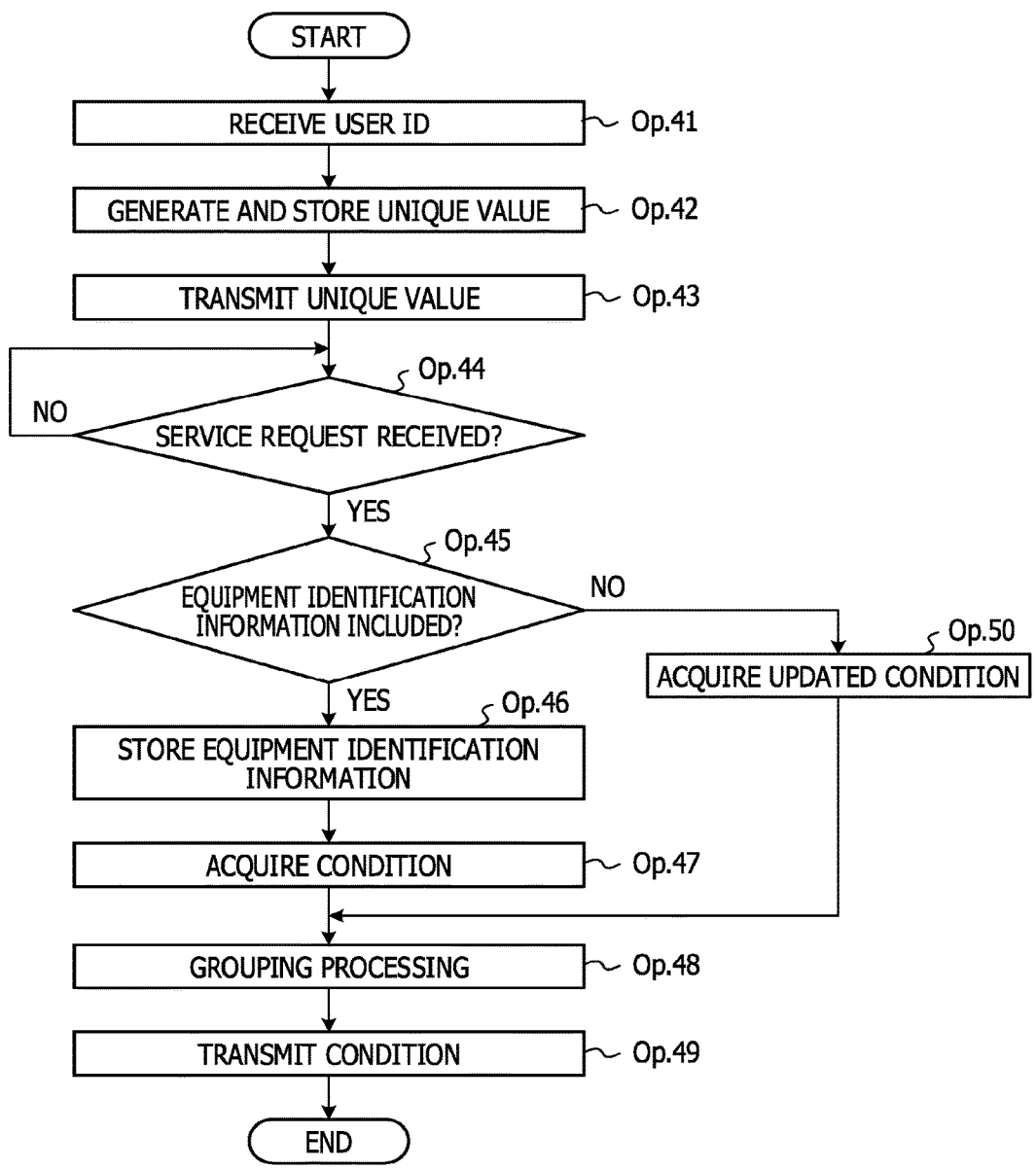
FIG. 18 is a flowchart of service provision processing in a server according to embodiment 2.

FIG. 18 is a flowchart of service provision processing in the server according to embodiment 2. The communication unit 51 receives a user ID from the communication device 7 (Op.41). Then, the control unit 52 generates a unique value and associates the generated unique value with the user ID to store the unique value in the management information storing unit 53 (Op.42). Under control by the control unit 52, the communication unit 51 transmits the unique value to the communication device 7 (Op.43).

The control unit 52 determines whether or not the communication unit 51 has received a service request from the communication device 7 (Op.44). As the service request, there are the service request transmitted in 204 in FIG. 13 and the service request transmitted in 210 in FIG. 13. The former includes the unique value and equipment identification information (terminal ID). On the other hand, the latter includes the unique value B acquired from another communication device 7 (second communication device 702), the unique value A of the self-device (first communication device 701), and an updated condition.

If the service request has not been received (NO of Op.44), the control unit 52 waits without any operation. On the other hand, if the service request has been received (YES of Op.44), the control unit 52 determines whether equipment identification information (terminal ID) is included in the service request (Op.45).

If the service request includes equipment identification information (YES of Op.45), the control unit 52 searches for the record having the unique value included in the service request from the management information storing unit 53. Then, the control unit 52 stores the equipment identification information included in the service request in the equipment identification information (terminal ID) of this record (Op.46). Moreover, the control unit 52 employs the equipment identification information (terminal ID) as a key and acquires the corresponding condition from the condition information storing unit 54 (Op.47). On the other hand, if the service request does not include equipment identification information (NO of Op.45), the control unit 52 acquires an updated condition from the service request (Op.50).

After the end of Op.47 or Op.50, the control unit 52 executes grouping processing (Op.48). For example, the control unit 52 stores the user ID identified from the unique value in the group information storing unit 55 in association with the equipment identification information (terminal ID).

Then, under control by the control unit 52, the communication unit 51 transmits the condition acquired in Op.47 or the updated condition acquired in Op.50 to the communication device 7 identified on the basis of the unique value included in the service request (Op.49). Then, the server 5 ends the series of processing.

Figure 19:
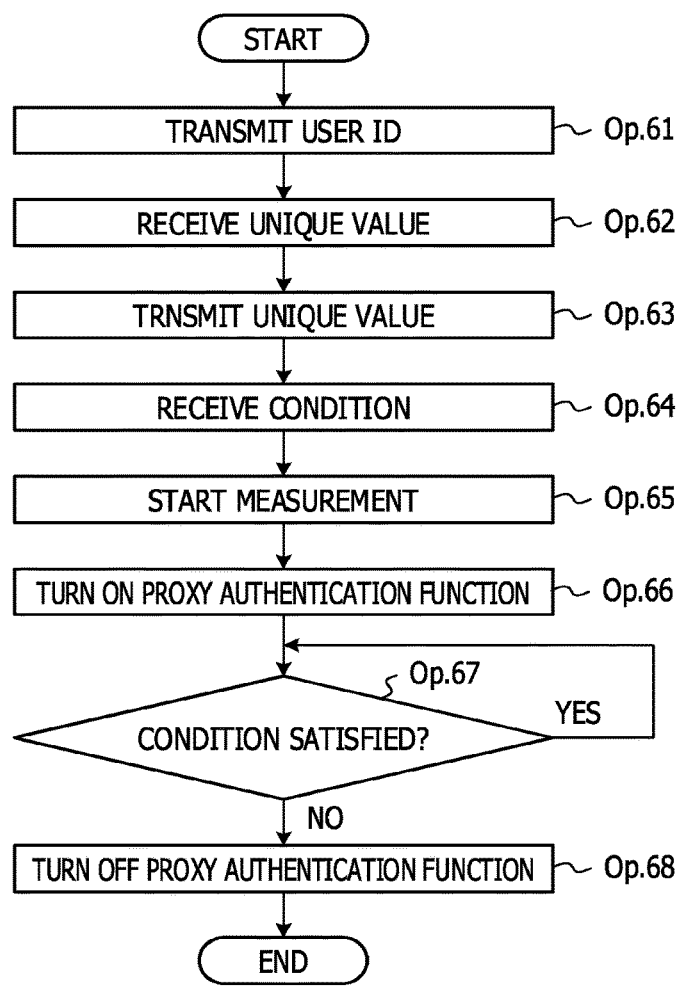
FIG. 19 is a flowchart of service request processing and proxy authentication processing in a communication device according to embodiment 2.

Next, FIG. 19 is a flowchart of service request processing and proxy authentication processing in the communication device according to embodiment 2. First, ahead of the processing of FIG. 19, the control unit 73 activates an application in response to an instruction from a user. In response to the activation of the application, the control unit 73 establishes a session between the communication device 7 and the server 5.

After the session is established, the first communication unit 71 transmits a user ID to the server 5 under control by the control unit 73 (Op.61). Then, the first communication unit 71 receives a unique value from the server 5 (Op.62). The unique value acquired here is temporarily held until the session is disconnected.

Next, the second communication unit 72 transmits the unique value to the site equipment 6 (Op.63). Alternatively, the second communication unit 72 transmits the unique value to another communication device 7 whose proxy authentication function is in the on-state (Op.63).

The control unit 73 waits until a condition is transmitted from the server 5. Then, the first communication unit 71 receives a condition from the server 5 (Op.64). If the communication device 7 is the first communication device 701, the condition is the initial condition acquired by the server 5 in Op.47. On the other hand, if the communication device 7 is the second communication device 702, the condition is the updated condition acquired by the server 5 in Op.50.

Next, the measuring unit 74 starts measurement under control by the control unit 73 (Op.65). For example, the measuring unit 74 starts measurement of the time if the condition is a condition relating to the elapsed time. Furthermore, the measuring unit 74 starts measurement of the movement distance if the condition is a condition relating to the movement distance. Then, along with the start of the measurement, the control unit 73 sets the proxy authentication function to the on-state (Op.66).

Next, every given time, the control unit 73 acquires a measurement value from the measuring unit 74 and determines whether or not the condition is satisfied (Op.67). If the condition is satisfied (YES of Op.67), the control unit 73 waits without any operation. On the other hand, if the condition is not satisfied (NO of Op.67), the control unit 73 turns off the proxy authentication function (Op.68). That is, the communication device 7 may not carry out the proxy authentication from then on.

Figure 20:
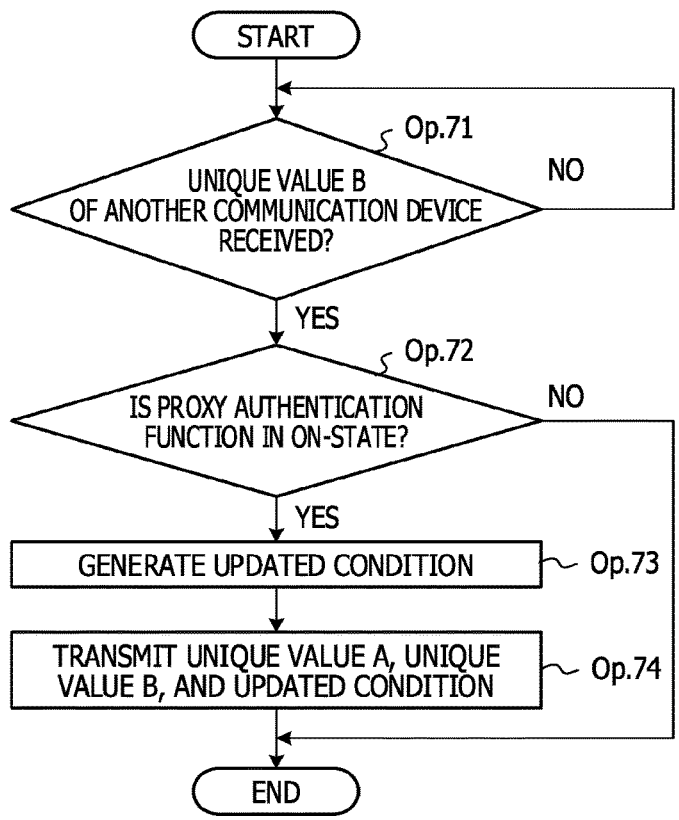
FIG. 20 is a flowchart of the case in which a unique value is received from another communication device.

Here, the case in which the communication device 7 receives a unique value (unique value B in FIG. 13) from another communication device 7 will be described. FIG. 20 is a flowchart of the case in which a unique value is received from another communication device.

First, the control unit 73 determines whether or not the second communication unit 72 has received the unique value B of another communication device 7 from the second communication unit 72 of the other communication device 7 (Op.71). If the unique value B has not been received (NO of Op.71), the control unit 73 waits without any operation.

On the other hand, if the unique value B has been received (YES of Op.71), the control unit 73 determines whether the proxy authentication function is in the on-state (Op.72). If the proxy authentication function is in the on-state (YES of Op.72), the control unit 73 generates an updated condition by using a measurement value acquired from the measuring unit 74 (Op.73). Then, the communication device 7 transmits the unique value A of the self-device, the acquired unique value B, and the updated condition to the server 5 (Op.74). It is to be noted that if the proxy authentication function is not in the on-state (NO of Op.72), the control unit 73 ends the series of processing illustrated in FIG. 20.

As described above, the communication device 7 according to embodiment 2 carries out the proxy authentication, which exempts other communication devices 7 from directly communicating with the site equipment 6. That is, the communication device 7 can authenticate the existence of other communication devices 7 in a specific place or range other than the vicinity of the site equipment 6. This improves the convenience of users.

Moreover, the on-state of the proxy authentication function is limited under a condition relating to a range confined on the basis of the time or distance. Thus, the present embodiment reduces erroneous authentication of another communication device 7 that does not exist at the specific place. This can keep the server 5 from providing a service to another communication device 7 that does not exist at the specific place.

Modification Examples of Embodiment 2

Although it is explained that the server 5 manages the given condition, the site equipment 6 may manage the given condition. The site equipment 6 may output the condition to the communication device 7. For example, after the first communication device 701 transmits the unique value A to the site equipment 6 in 203 in FIG. 13, the site equipment 6 may transmit a condition stored in a storing area of the site equipment 6 in advance to the first communication device 701.

Embodiment 3

In embodiment 3, the server 1 according to embodiment 1 and the server 5 according to embodiment 2 are implemented by the following computer 1000. Furthermore, the communication device 3 according to embodiment 1 and the communication device 7 according to embodiment 2 are implemented by the following computer 2000.

Figure 21:
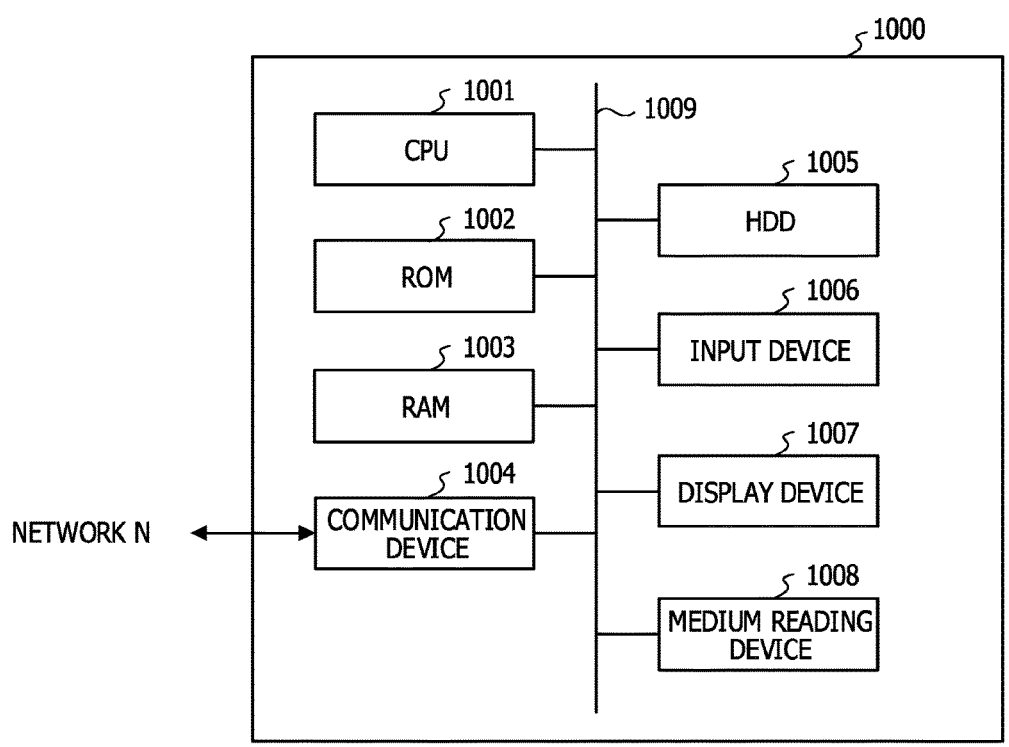
FIG. 21 is a hardware configuration example of a computer (server)

FIG. 21 is a hardware configuration example of the computer (server). The computer 1000 executes processing relating to the respective embodiments and functions as the server 1 or the server 5.

The computer 1000 includes a central processing unit (CPU) 1001, a read only memory (ROM) 1002, a random access memory (RAM) 1003, a communication device 1004, a hard disk drive (HDD) 1005, an input device 1006, a display device 1007, and a medium reading device 1008, and the respective units are mutually coupled via a bus 1009. Furthermore, the respective units can mutually transmit and receive data under control by the CPU 1001.

A program relating to the processing of the respective embodiments is recorded in a recording medium that can be read by the computer 1000. Among the recording media that can be read by the computer 1000 are a magnetic recording device, an optical disc, a magneto-optical recording medium, a semiconductor memory, and so forth. Among the magnetic recording devices are an HDD, a flexible disc (FD), a magnetic tape (MT), and so forth.

Among the optical discs are a digital versatile disc (DVD), a DVD-RAM, a compact disc-read only memory (CD-ROM), a compact disc-recordable/rewritable (CD-R/RW), and so forth. Among the magneto-optical recording media are a magneto-optical disk (MO) and so forth. In the case of distributing a program in which processing relating to the respective embodiments is described, it is conceivable that a portable recording medium such as a DVD or a CD-ROM in which this program is recorded is sold for example.

Furthermore, the medium reading device 1008 of the computer 1000 that executes the program according to the present embodiment reads out the program from the recording medium in which the program is recorded. The CPU 1001 stores the read-out program in the HDD 1005 or the ROM 1002 and the RAM 1003. The CPU 1001 is a central processing device responsible for operation control of the whole of the server 1 or the server 5.

Then, the CPU 1001 reads out the program in which the processing relating to the respective embodiments is described from the HDD 1005 and executes the program. The CPU 1001 thereby functions as the control unit 12 in the server 1 or the control unit 52 in the server 5. As described above, the program may be stored in the ROM 1002 or the RAM 1003, which can access the CPU 1001.

The communication device 1004 functions as the communication unit 11 in the server 1 or the communication unit 51 in the server 5 under control by the CPU 1001. The communication device 1004 in the computer 1000 is a communication interface and controls communications via the network N. The communications controlled by the communication interface utilize radio communications to access the network N via a radio base station. One example of the communication interface is a network interface card (NIC).

The HDD 1005 stores various kinds of information and functions as the management information storing unit 13, the condition information storing unit 14, and the group information storing unit 15 in the server 1 under control by the CPU 1001. Alternatively, the HDD 1005 stores various kinds of information and functions as the management information storing unit 53, the condition information storing unit 54, and the group information storing unit 55 in the server 5 under control by the CPU 1001.

The various kinds of information may be stored in the ROM 1002 or the RAM 1003, which can access the CPU 1001, as with the program. Moreover, various kinds of information temporarily generated and held in the process of processing are stored in the RAM 1003 for example.

The input device 1006 accepts various kinds of inputs. The input device 1006 is a keyboard and a mouse for example. The display device 1007 displays various kinds of information. The display device 1007 is a display for example.

Figure 22:
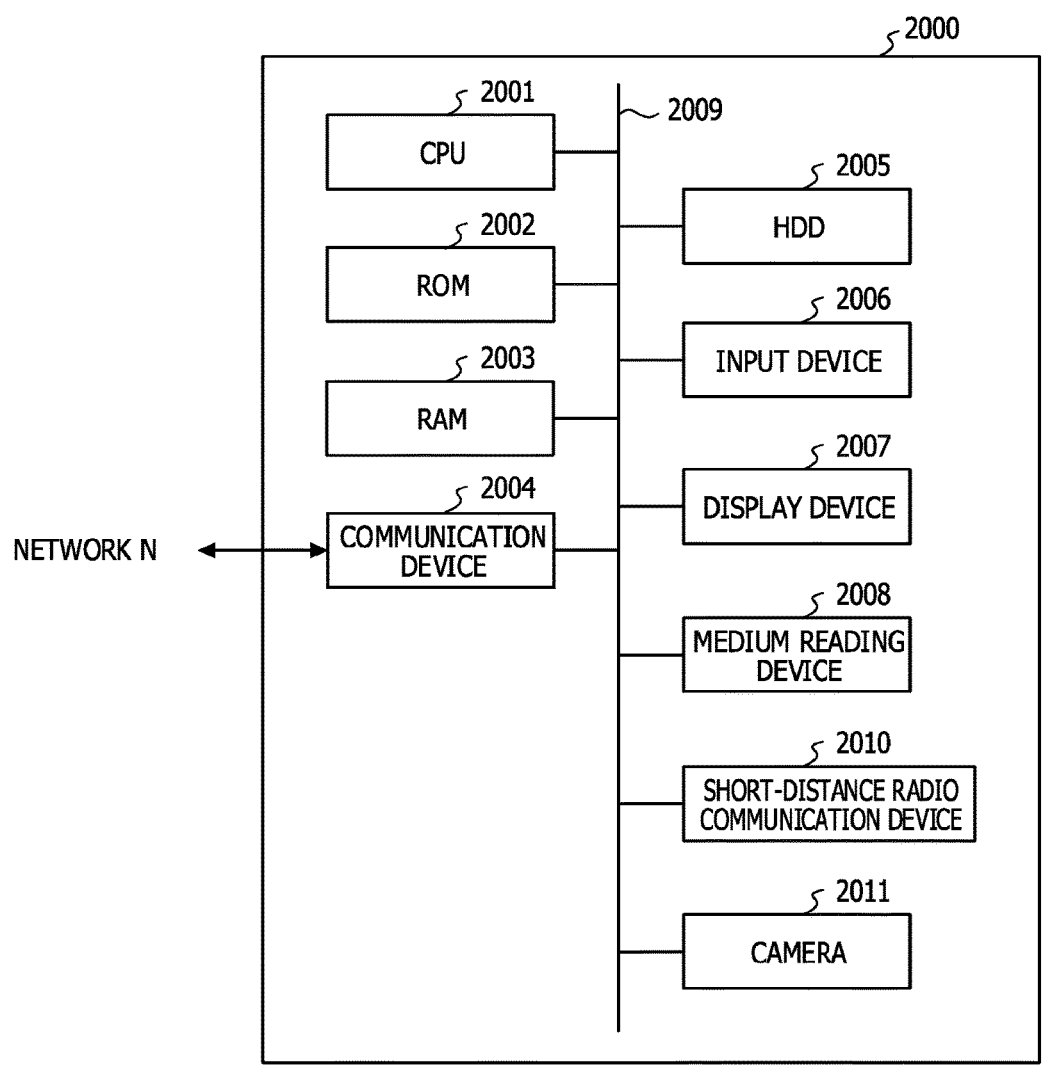
FIG. 22 is a hardware configuration example of a computer (communication device).

FIG. 22 is a hardware configuration example of the computer (communication device). It is to be noted that the computer 2000 executes processing relating to the respective embodiments and functions as the communication device 3 or the communication device 7. The communication device 3 is the first communication device 301 or the second communication device 302. Furthermore, the communication device 7 is the first communication device 701 or the second communication device 702.

The computer 2000 includes a CPU 2001, a ROM 2002, a RAM 2003, a communication device 2004, an HDD 2005, an input device 2006, a display device 2007, a medium reading device 2008, a short-distance radio communication device 2010, and a camera 211 and the respective units are mutually coupled via a bus 2009. Furthermore, the respective units can mutually transmit and receive data under control by the CPU 2001.

A program relating to the processing of the respective embodiments is recorded in a recording medium that can be read by the computer 2000. Among the recording media that can be read by the computer 2000 are a magnetic recording device, an optical disc, a magneto-optical recording medium, a semiconductor memory, and so forth. Among the magnetic recording devices are an HDD, an FD, an MT, and so forth.

Among the optical discs are a DVD, a DVD-RAM, a CD-ROM, a CD-R/RW, and so forth. Among the magneto-optical recording media are an MO and so forth. In the case of distributing a program in which processing relating to the respective embodiments is described, it is conceivable that a portable recording medium such as a DVD or a CD-ROM in which this program is recorded is sold for example.

Furthermore, the medium reading device 2008 of the computer 2000 that executes the program according to the present embodiment reads out the program from the recording medium in which the program is recorded. The CPU 2001 stores the read-out program in the HDD 2005 or the ROM 2002 and the RAM 2003. The CPU 2001 is a central processing device responsible for operation control of the whole of the communication device 3 or the communication device 7.

Then, the CPU 2001 reads out the program in which the processing relating to the respective embodiments is described from the HDD 2005 and executes the program. The CPU 2001 thereby functions as the control unit 33 in the communication device 3 or the control unit 73 in the communication device 7. As described above, the program may be stored in the ROM 2002 or the RAM 2003, which can access the CPU 2001.

The communication device 2004 functions as the first communication unit 31 in the communication device 3 or the first communication unit 71 in the communication device 7 under control by the CPU 2001. The communication device 2004 in the computer 2000 is a communication interface and controls communications via the network N. The communications controlled by the communication interface utilize radio communications to access the network N via a radio base station. One example of the communication interface is an NIC.

The HDD 2005 stores various kinds of information and functions as the proxy authentication information storing unit 35 in the communication device 3 or the proxy authentication information storing unit 75 in the communication device 7 under control by the CPU 2001. The various kinds of information may be stored in the ROM 2002 or the RAM 2003, which can access the CPU 2001, as with the program.

Moreover, various kinds of information temporarily generated and held in the process of processing are stored in the RAM 2003 for example.

The input device 2006 accepts various kinds of inputs. The input device 2006 is a keyboard and a touch panel for example. The display device 2007 displays various kinds of information. The display device 2007 is a display for example.

The short-distance radio communication device 2010 functions as the second communication unit 32 in the communication device 3 or the second communication unit 72 in the communication device 7 under control by the CPU 2001. The camera 2011 photographs an image under an instruction by a user or an application. For example, in the case of an embodiment in which the QR code is used, the camera 2011 photographs an image of a QR code and inputs the photographed image to the CPU 2001.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A proxy authentication method executed by a communication device, the proxy authentication method comprising:

requesting, by a first communication device located in a specific place, an equipment located in the specific place to transmit, to the first communication device, equipment identification information which includes equipment identification identifying the equipment and proving that the first communication device exists in the specific place;

acquiring, by the first communication device, the equipment identification information from the equipment;

transmitting, by the first communication device, a service request including the equipment identification information to a server to receive a service according to the specific place from the server;

receiving, by the first communication device, from the server, a condition relating to at least one of an elapsed time from acquisition of the equipment identification information by the first communication device and a movement distance from the acquisition of equipment identification information by the first communication device and a proxy authentication value;

providing, by the first communication device, the proxy authentication value to a second communication device which is estimated to exist in the specific place in a case where the elapsed time is equal to or shorter than a time threshold or the movement distance is equal to or shorter than a distance threshold;

not providing, by the first communication device, the proxy authentication value to the second communication device in a case where the elapsed time is greater than the time threshold or the movement distance is greater than the distance threshold; and transmitting, by the second communication device, the proxy authentication value to the server to receive the service according to the specific place when receiving the proxy authentication value from the first communication device.

2. The proxy authentication method according to claim 1, wherein the service is a service of distributing first information to a group including the first communication device and the second communication device.

3. The proxy authentication method according to claim 1, wherein the equipment is a tag or a computer, the tag is set at a specific place and includes a short-distance radio communication function, and the computer includes the short-distance radio communication function.

4. A communication device comprising:
a memory configured to store instructions; and
a processor coupled to the memory, located in a specific place and configured to execute the instructions to:
  request an equipment located in the specific place to transmit, to the communication device, equipment identification information which includes equipment identification identifying the equipment and proving that the communication device exists in the specific place,
  acquire the equipment identification information from the equipment,
  transmit a service request including the equipment identification information to a server to receive a service according to the specific place from the server,
  receive, from the server, a condition relating to at least one of an elapsed time from acquisition of the equipment identification information by the communication device and a movement distance from the acquisition of equipment identification information by the communication device and a proxy authentication value,
  provide the proxy authentication value to another communication device which is estimated to exist in the specific place in a case where the elapsed time is equal to or shorter than a time threshold or the movement distance is equal to or shorter than a distance threshold, and
  not provide the proxy authentication value to the another communication device in a case where the elapsed time is greater than the time threshold or the movement distance is greater than the distance threshold,
wherein the another communication device transmits the proxy authentication value to the server to receive the service according to the specific place when receiving the proxy authentication value from the communication device.

5. The communication device according to claim 4, wherein the service is a service of distributing first information to a group including the communication device and the another communication device.

6. The communication device according to claim 4, wherein the equipment is a tag or a computer, the tag is set at a specific place and includes a short-distance radio communication function, and the computer includes the short-distance radio communication function.

7. A non-transitory computer-readable medium storing a program, which when executed perform a proxy authentication process comprising:
  requesting, by a first communication device located in a specific place, an equipment located in the specific place to transmit, to the first communication device, equipment identification information which includes equipment identification identifying the equipment and proving that the first communication device exists in the specific place;
  acquiring, by the first communication device, the equipment identification information from the equipment;
  transmitting, by the first communication device, a service request including the equipment identification information to a server to receive a service according to the specific place from the server;
  receiving, by the first communication device, from the server, a condition relating to at least one of an elapsed time from acquisition of the equipment identification information by the first communication device and a movement distance from the acquisition of equipment identification information by the first communication device and a proxy authentication value;
  providing, by the first communication device, the proxy authentication value to a second communication device which is estimated to exist in the specific place in a case where the elapsed time is equal to or shorter than a time threshold or the movement distance is equal to or shorter than a distance threshold;
  not providing, by the first communication device, the proxy authentication value to the second communication device in a case where the elapsed time is greater than the time threshold or the movement distance is greater than the distance threshold; and
  transmitting, by the second communication device, the proxy authentication value to the server to receive the service according to the specific place when receiving the proxy authentication value from the first communication device.

8. The non-transitory computer-readable medium according to claim 7, wherein the service is a service of distributing first information to a group including the first communication device and the second communication device.

9. The non-transitory computer-readable medium according to claim 7, wherein the equipment is a tag or a computer, the tag is set at a specific place and includes a short-distance radio communication function, and the computer includes the short-distance radio communication function.

* * * * *